Patented Feb. 13, 1940

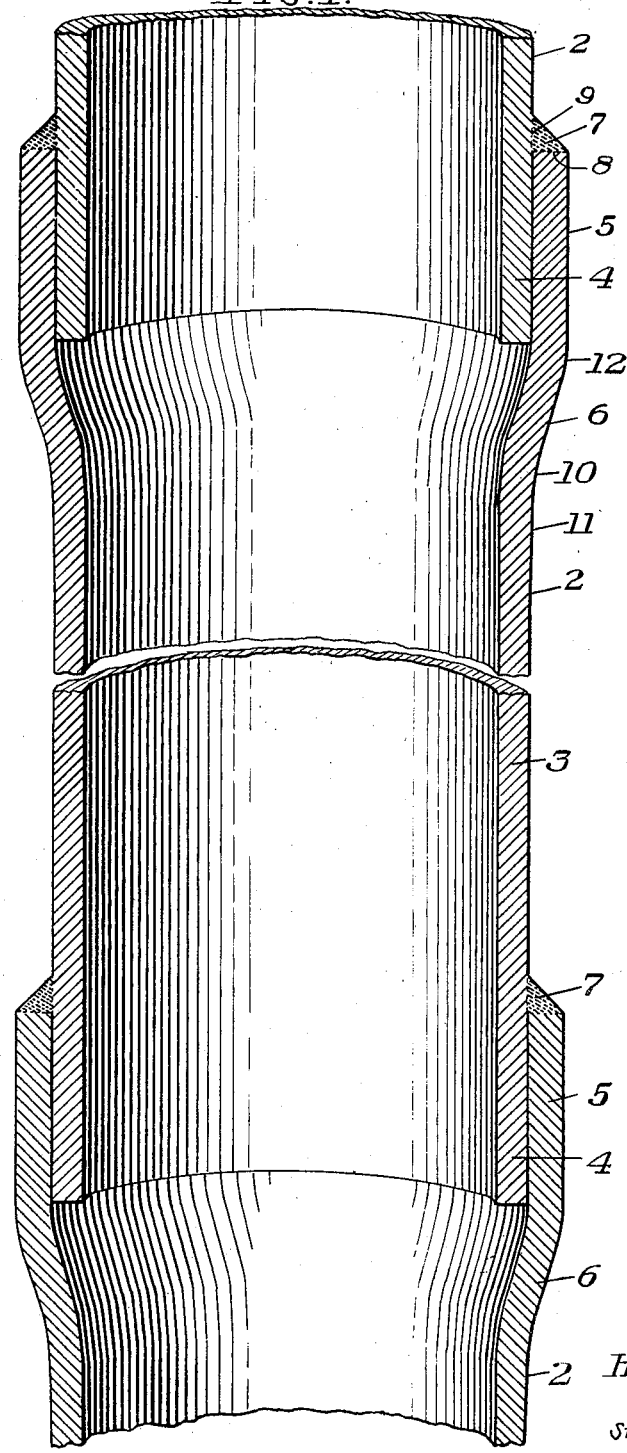
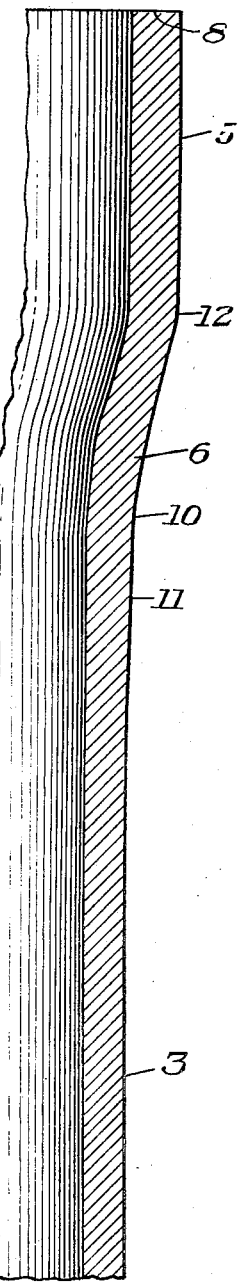

2,190,362

UNITED STATES PATENT OFFICE 2,190,362

WELL CASING

Howard N. Keener, Baden, Pa., assignor to Jones & Laughlin Steel Corporation, Pittsburgh, Pa., a corporation of Pennsylvania Application November 15, 1938, Serial No. 240,489

5 Claims. (Cl. 166—4)

This invention relates to well casing and more particularly to what is known as "welded in the hole" well casing, in which successive lengths of casing are added and welded as the casing is sunk into the well.

It is common to construct such welded well casings of sections having bell and spigot joints in which the edge of the bell is welded to the side of the spigot where it enters the bell. The bells have been formed by expanding the end of the piece of tubing. Such expanding process has a tendency to result in eccentricity between the axis of the bell and that of the tubing and to also produce a bell of uneven wall thickness. The expanding process thins the wall of the bell as compared with that of the tubing, so that the thickness of the weld metal against the end of the bell is less than that of the tubing. The weld metal which is united with the end of the bell and with the side of the spigot of the next piece of tubing has a triangular cross section, the exposed face being generally at an angle of about 45° to the axis of the tubing. The weld area against the end of the bell is in direct tension. The weld area against the spigot is in direct shear. The metal of the weld at the intermediate points is subjected to a combined shear and tensile stress. Because of these stresses the weakest point of welded bell and spigot type joint well casing when made as above described has been in the welds, where failure took place.

I have found that the weld may be made as strong if not stronger than the tubing to resist the tensile pull to which the welded joint is subjected, by suitably thickening the wall of the bell. Not only is the surface of the bell to which the weld is applied made substantially thicker so as to increase the size of the weld, but the tapered portion of the tubing which joins the bell with the body of the tubing is also preferably thickened as an additional precaution against subjecting the weld to bending stresses.

In the drawing, which illustrates the preferred embodiment of the invention:

Fig. 1 is a central longitudinal section through a welded well casing with the intermediate portion of the section cut away; and Fig. 2 is a fragmentary cross-sectional view of an enlarged scale showing the upset and thickened bell end.

Referring to the illustrated embodiment of the invention, the well casing comprises a series of identical sections 2 which are welded together. Each section has a cylindrical body portion 3 terminating at one end in a spigot 4 of the same diameter as the body portion and terminating at the other end in a bell 5 which is joined to the body portion by the outwardly flared connecting portion 6. As the well casing is sunk into the well it is progressively moved downward and sections are added to the pipe. Each section has its spigot end downwardly which enters the bell of the section below and the sections are welded together by a weld 7 which normally covers substantially the entire upper face 8 of the bell and joins the side of the spigot 4 at the area indicated by reference numeral 9.

The wall thickness of the bell 5 is greater than that of the body portion 3 of the casing, preferably being at least 10 to 20% thicker, usually about 25% thicker, than the body of the casing. The thickening of the bell 5 provides a face 8 of a cross-sectional area greater than the cross-sectional area of the body portion of the casing. Since the diameter of the bell is greater than that of the spigot, an increase say of 20% in the wall thickness of the bell over the casing, results in an even greater increase in the area of the face 8 over the cross-sectional area of the casing at the spigot. The weld 7 usually has a triangular cross-section as illustrated, the outer face of the weld usually being at an angle of about 45° to the axis of the casing. The enlargement of the face 8 of the bell permits the entire weld to be enlarged, thus increasing not only the area of contact of the weld with the face 8 which is under tension, but also the area of contact 9 with the spigot which is under shear, and the intermediate body of the weld metal which is under combined tension and shear. Tests have shown that the increased strength imparted to the weld by a 25% increase of the area 8 at the end of the bell over the cross-section area of the body of the casing, produces a welded joint which is stronger than the casing itself so that under pulling tests failure takes place at points other than at the weld. Not only is the bell proper 5 of greater wall thickness than the casing, but the outwardly flared connecting portion 6 between the bell and body of the casing is thickened, preferably to approximately the same extent as the bell. This thickening is extended even below the angle 10 where the outwardly flared portion 6 joins the body portion 3 so that the flared connecting portion 6 joins the body portion with a smooth taper, the thickened tapered end of the body portion being indicated at 11. In a long well casing the welded joint is subjected to great tension and since the outwardly flared connecting portion 6 is joined to the body portion 3 and the bell 4 by angles 10 and 12, respectively, the downward pull of the casing tends to strain these angles and to subject the weld 7 to a bending stress. By increasing the thickness of the connecting portion 6, sufficient additional stiffness is imparted to substantially eliminate such bending stresses so that the stress applied to the weld 7 is practically entirely that of the straight downward pull of the bell 5 with respect to the spigot 4.

The casing sections are preferably made from lengths or blanks of steel tubing of uniform diameter and wall thickness and of high tensile strength, preferably of seamless or welded tubing. The bell 5, the outwardly flared connecting portion 6, and the tapered merging portion 11 are preferably formed by an upsetting operation by which the wall thickness is increased in forming the bell. As the technique of the upsetting processes is well known in the art, it need not be described here in detail. An example of an upsetting process of the general type preferably employed is shown in the Lynch Patent No. 2,065,595.

While I have shown and described the preferred embodiment of my invention, it is to be understood that the invention is not so limited but may be otherwise embodied and practiced within the scope of the following claims.

I claim:

1. A welded bell and spigot joint well casing comprising a series of casing sections which have a spigot end and a bell end, the bell having a wall thickness greater than that of the body portion of the section and being integrally united with the body portion by an outwardly flared connecting portion also having a wall thickness greater than that of the body portion, and welds joining the ends of the bells with the sides of the spigots.

2. A welded bell and spigot joint well casing comprising a series of casing sections which have a spigot end and a bell end, the bell having a wall thickness greater than that of the body portion of the section and being integrally united with the body portion by an outwardly flared connecting portion also having a wall thickness greater than that of the body portion, the adjacent end of the body portion being also thickened to provide a smooth taper merging the thickened connecting portion with the body portion, and welds joining the ends of the bells with the sides of the spigots.

3. A welded bell and spigot joint well casing comprising a series of casing sections having bell and spigot ends, the metal of the bells being upset to a wall thickness greater than that of the body portion of the casing, and welds joining the ends of the bells with the sides of the spigots.

4. A welded bell and spigot joint well casing comprising a series of casing sections having bell and spigot ends, the bells at at least their end portions having a wall thickness at least 20% greater than that of the body portions of the casing and being integrally united with the body portions by outwardly flared connecting portions having a wall thickness greater than that of the body portion, and welds joining the ends of the bells and the sides of the spigots.

5. A welded bell and spigot joint well casing comprising a series of casing sections having bell and spigot ends, the bells at at least their end portions having a wall thickness greater than that of the body portion of the casing, and welds joining the ends of the bells with the sides of the spigots.

HOWARD N. KEENER.